United States Patent
Sharma et al.

(10) Patent No.: US 6,912,569 B1
(45) Date of Patent: Jun. 28, 2005

(54) METHOD AND APPARATUS FOR MIGRATION OF MANAGED APPLICATION STATE FOR A JAVA BASED APPLICATION

(75) Inventors: Rahul Sharma, San Jose, CA (US); Vladimir Matena, Redwood City, CA (US); Masood Mortazavi, Cupertino, CA (US); Sanjeev Krishnan, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 640 days.

(21) Appl. No.: 09/846,492

(22) Filed: Apr. 30, 2001

(51) Int. Cl.[7] .......................... G06F 15/173; G06F 3/00

(52) U.S. Cl. ...................... 709/223; 709/224; 719/315; 719/316

(58) Field of Search ................................. 709/215, 223, 709/224, 203, 209, 231, 232; 719/315, 316; 707/8, 103, 202, 203, 204; 714/11, 13, 15, 16, 42

(56) References Cited

U.S. PATENT DOCUMENTS

| | | | | |
|---|---|---|---|---|
| 5,832,522 | A | * | 11/1998 | Blickenstaff et al. ....... 707/204 |
| 5,941,999 | A | * | 8/1999 | Matena et al. ................. 714/6 |
| 6,182,086 | B1 | | 1/2001 | Lomet et al. |
| 6,351,776 | B1 | * | 2/2002 | O'Brien et al. ............. 709/245 |
| 6,457,065 | B1 | * | 9/2002 | Rich et al. .................. 719/328 |
| 6,557,100 | B1 | * | 4/2003 | Knutson ..................... 713/100 |
| 6,581,088 | B1 | * | 6/2003 | Jacobs et al. ............... 718/105 |
| 6,591,272 | B1 | * | 7/2003 | Williams .................... 707/102 |
| 6,704,805 | B1 | * | 3/2004 | Acker et al. ................ 719/315 |
| 6,845,390 | B1 | * | 1/2005 | Jorgenson et al. .......... 709/205 |

OTHER PUBLICATIONS

Kubatowicz et al., OceanStore: An Architecture for Global–Scale Persistent Storage, Nov. 2000, A.C.M., 190–199.*

Silva et al., Fault–Tolerant Execution of Mobile Agents, 2000, IEEE.*

Deshpande, Clustering: Transparent Replication, Load Balancing, and Failover, Jan. 2000.*

Sailil Deshpande, "*Clustering: Transparent Replication, Load Balancing, and Failover,*" Jan. 2000, Retrieved from the Internet: <http://bdn.borland.com/article/images/26438/11501_r1.pdf>.

Silva et al., "*Fault–Tolerant Execution of Mobile Agents,*" Dependable Systems and Networks, 2000. DSN 2000. Proceedings International Conference on New York, NY, USA Jun. 25–28, 2000, IEEE Comput. Soc., US, Jun. 25, 2000 pp. 135–143.

(Continued)

*Primary Examiner*—Ario Etienne
*Assistant Examiner*—El Hadji Sall
(74) *Attorney, Agent, or Firm*—Martine Penilla & Gencarella LLP

(57) ABSTRACT

An invention for migrating managed application state for a Java based application is disclosed. A first Java module is executed on a first server. The first Java module includes a first entity bean and a first state object in communication with the first entity bean. The first state object stores a state of the first entity bean. The first state object is replicated to a state server or stored in-memory and made capable of migration by replicated state manager. Then, a second Java module is started on a second server as part of the module migration by a control module. The second Java module includes a second state object that is populated with state by either recovering from replica of fist state object stored on the state server or by getting transferred state of an in-memory copy of first state object managed on first server.

26 Claims, 13 Drawing Sheets

OTHER PUBLICATIONS

Little et al., *"Maintaining Information about Persistent Replicated Objects in a Distributed System,"* Proceedings of the International Conference on Distributed Computing Systems. Pittsburgh, PA, May 25–28, 1993 and IEEE Comp. Soc. Press, U.S., vol. Conf. 13, May 25, 1993, pp. 491–498.

Sonntag et al., *"Adaptability Using Reflection,"* System Sciences, 1994, vol. II: Software Technology, Proceedings of the Twenty–Seventh Hawaii International Conference on Wailea, HI, USA, Jan. 4–7, 1994 pp. 383–392.

Estublier et al., *"Interoperability and Distribution of Process–Sensitive Systems,"* Software Engineering for Parallel and Di8stributed Systems, 1998. Proceedings International Symposium on Kyoto, Japan, Apr. 20–21, 1998. IEEE Comput. Soc., US Apr. 20, 1998, pp. 103–114.

* cited by examiner

METHOD AND APPARATUS FOR MIGRATION OF MANAGED APPLICATION STATE FOR A JAVA BASED APPLICATION

CROSS REFERENCE TO RELATED APPLICATIONS

This application is related to (1) U.S. patent application Ser. No. 09/812,536, filed Mar. 19, 2001, and "Method and Apparatus for Providing Application Specific Strategies to a Java Platform including Start and Stop Policies," (2) U.S. patent application Ser. No. 09/812,537, filed Mar. 19, 2001, and entitled "Method and Apparatus for Providing Application Specific Strategies to a Java Platform including Load Balancing policies," (3) U.S. patent application Ser. No. 09/833,845, filed Apr. 11, 2001, and entitled "Method and Apparatus for Performing Online Application Upgrades in A Java Platform," (4) U.S. patent application Ser. No. 09/833,856, filed Apr. 11, 2001, and entitled "Method and Apparatus for Performing Failure Recovery in a Java Platform," (5) U.S. patent application Ser. No. 09/818,214, filed Mar. 26, 2001, and entitled "Method and Apparatus for Managing Replicated and Migration Capable Session State for A Java Platform," (6) U.S. patent application Ser. No. 09/825,249, filed Apr. 2, 2001, and entitled "Method and Apparatus for Partitioning Managed State for a Java based Application" (7) U.S. patent application Ser. No. 09/846,067, filed Apr. 30, 2001, and entitled "Method and Apparatus for Upgrading Managed Application State for a Java based Application." Each of the above related application are incorporated in be reference.

BACKGROUND OF THE INVENTION

1. Field of the Invention

This invention relates generally to Java programming, and more particularly to methods for migration of managed application state for Java based Applications.

2. Description of the Related Art

Today's world of computer programming offers many high-level programming languages. Java, for example, has achieved widespread use in a relatively short period of time and is largely attributed with the ubiquitous success of the Internet. The popularity of Java is due, at least in part, to its platform independence, object orientation and dynamic nature. In addition, Java removes many of the tedious and error-prone tasks that must be performed by an application programmer, including memory management and cross-platform porting. In this manner, the Java programmer can better focus on design and functionality issues.

One particular Java environment is the Java 2 platform, Enterprise Edition (J2EE), which facilitates building Web-based and enterprise applications. Broadly speaking, J2EE services are performed in the middle tier between the user's browser and the databases and legacy information systems. J2EE comprises a specification, reference implementation and a set of testing suites. J2EE further comprises Enterprise JavaBeans (EJB), JavaServer Pages (JSP), Java servlets, and a plurality of interfaces for linking to information resources in the platform.

The J2EE specifications define how applications should be written for the J2EE environment. Thus the specifications provide the contract between the applications and the J2EE platform. One aspect of the J2EE specification is the EJB 2.0 Container Managed Persistence (CMP). The EJB 2.0 specification defines a contract between an entity bean, its container and the persistence manager for the management of persistent state and relationships for the entity beans. For a complete specification of CMP, refer to the EJB 2.0 specification published by Sun Microsystems, Inc., which is incorporated by reference herein in its entirety.

According to the EJB programming model, a bean provider develops a set of entity beans for an application and specifies the relationships between these objects. For each entity bean, the bean provider specifies an abstract persistence schema, which defines a set of methods for accessing the container-managed fields and relationships for the entity bean. The container-managed fields and relationships of the abstract persistence schema are specified in the deployment descriptor defined by the bean provider.

The deployer uses the persistence manager provider tools to determine how persistent fields and relationships are mapped to the underlying persistence mechanism, such as, a database. The persistence manager tools also generate the additional classes and interfaces that enable the persistence manager to manage the persistent fields and relationships of the entity beans at the runtime. An advantage of container managed persistence is that the entity beans become logically independent of the underlying persistence mechanism. The CMP also leads to a simple programming mode for managing persistence.

An entity bean with container manager persistence includes its class, a remote or local interface that defines its client-view business methods, a home interface that defines create, remove, home and finder methods. The abstract persistence schema comprises a set of properties, each representing a field or relationship in the persistent state of entity bean. The entity bean defines a set of accessor (setter and getters) methods for the persistent fields and relationships.

The bean provider generally does not write any database access calls in the entity bean class. Instead, a persistence manager that is available to the container at runtime handles the persistence. The bean provider codes all persistent data access using the setter and getter methods defined for the container-managed persistent and relationship fields.

FIG. 1 is a diagram showing the tradeoffs that business and carrier grade applications have to make. The carrier grade applications, which are applications used in high-performance, high-traffic networks such as used by telecoms, service providers and ISPs, require higher performance and availability than business applications.

Carrier grade (CG) applications require high availability of the order of five 9's and better. A high availability environment is one in which a service or component has greater availability, usually due to component redundancy, than in some base environment. Typically the term is used to describe failover cluster environment in which a service is provided by a primary component, until after some failure, after which the secondary component takes over the provision of the service. The high availability requirement for carrier grade applications leads to a requirement for a carrier grade application to achieve prompt (two seconds or less) restart or failover to a secondary component with minimal disruption of service. Thus, the application has to become operational within minimal time after a failure.

A carrier grade application requires a shorter failover time as compared to the business applications, which typically store persistent state in a database to achieve ACID (Atomicity, Consistency, Isolation, Durability) properties for the managed state. Business applications rely on database-specific mechanisms to achieve state replication, thereby protecting persistent data from the failure of the primary database.

A typical database replication mechanism is database log replay. The database logs changes in a transaction log that is used for transaction replay in case of a failure.

The log replay involves applying the transaction log to a replica database so that a near-mirror copy of primary database is created. Unfortunately, the time-delay in replaying the transaction log on the replica database slows down the failover. Moreover, a huge rate of inserts/updates may create huge transaction replay log, which further slows the transaction replay at the failure time.

Business applications also rely on parallel database servers to achieve state replication and failover. In case of parallel database servers, multiple active database engines, coordinated by a distributed lock manager, manage active replication. However, use of the distributed lock manager for coordinating database operations slows down the application performance. Hence, the use of a parallel database server is considered more suitable for read-only and read-mostly applications. With the short failover time requirement, a typical carrier grade application cannot rely on a database-based replication mechanism or a parallel database server to achieve state replication and failover.

Business applications typically need to maintain ACID properties for the data being used by the application. Such applications cannot afford any data inconsistency and thereby store persistent data in a database and use transactions. For business applications, the tradeoff between consistency and concurrency gets reflected in the choice of the database isolation level. The use of optimistic concurrency model as against pessimistic concurrency model is another design decision involved in the business applications as part of the consistency and concurrency tradeoff. Business applications also need a reliable and consistent database failover and recovery—these applications cannot afford any inconsistent data.

The carrier grade applications may have consistency and concurrency requirements that differ from the business applications. A carrier grade application may process multiple concurrent state transitions and may not require full ACID properties to be maintained for its managed state. For example, a CG J2EE application may need a fast failover and may afford to have the replica (now the new primary) take over in a state that is temporally inconsistent with the initial primary. The client using the carrier grade application should be able to bring the new primary into a consistent state by retrying transactions for state transitions. Moreover, the carrier grade applications and their application states often must be capable of migrating from one J2EE server process to another.

In view of the forgoing, there is a need for systems and methods that manage state for applications that require high availability, and allow for migration of the managed state across multiple Java server processes. The systems and methods should allow for state replication and provide high availability of the order of five 9's and better to carrier grade applications, and further allow for online upgrades of carrier grade software.

SUMMARY OF THE INVENTION

Broadly speaking, the present invention fills these needs by providing systems and methods that allow migration of managed state across J2EE server processes. In one embodiment, a method for migrating managed application-specific and session state for a Java based application is disclosed. A first Java module is executed on a first J2EE server. The first Java module includes a first entity bean and a first state object in communication with the first entity bean. The first state object stores a state of the first entity bean. Next, the first state object is replicated to a state server. Then, a second Java module is started on a second J2EE server, where the second Java module includes a second state object that is generated by migration of managed state using the first state object replicated on the state server. Replicated State Manager supports mechanism for migration of managed state from first J2EE to second J2EE server process. The state server can be a memory replicated state server or a disk replicated state server. To replicate the first state object to the state server, checkpointing can be used. In addition, a migration-capable non-replicated state for the first entity bean can be transferred to the secbnd J2EE server using a replicated state manager specific transfer protocol.

In another embodiment, a system for migrating managed state for a Java based application is disclosed. The system includes a first J2EE server executing a first Java module, wherein the first Java module includes a first entity bean and a first state object in communication with the first entity bean. The first state object stores a state of the first entity bean. A state server is also included that is in communication with the first J2EE server and is further capable of storing the first state object. The system further includes a second J2EE server in communication with the state server and the first server. The second server is capable of starting a second Java module having a second state object that is generated using the first state object stored on the state server.

Advantageously, the embodiments of the present invention allow migration of managed application-specific and session state across multiple J2EE server processes without serious impact on the performance of the application. As a result, applications executing on the Java system of the embodiments of the present invention can, in some embodiments, achieve continuous availability, on the order of about 99.9999% uptime or better. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for systems and methods that provide migration for the managed state of Java applications, including applications requiring high availability. To this end, embodiments of the present invention provide a subsystem that manages the replicated and migration capable state for an Enterprise Java Bean (EJB) application using state management units. The embodiments further provide mechanisms to allow migration of the managed state from one J2EE server process to another. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
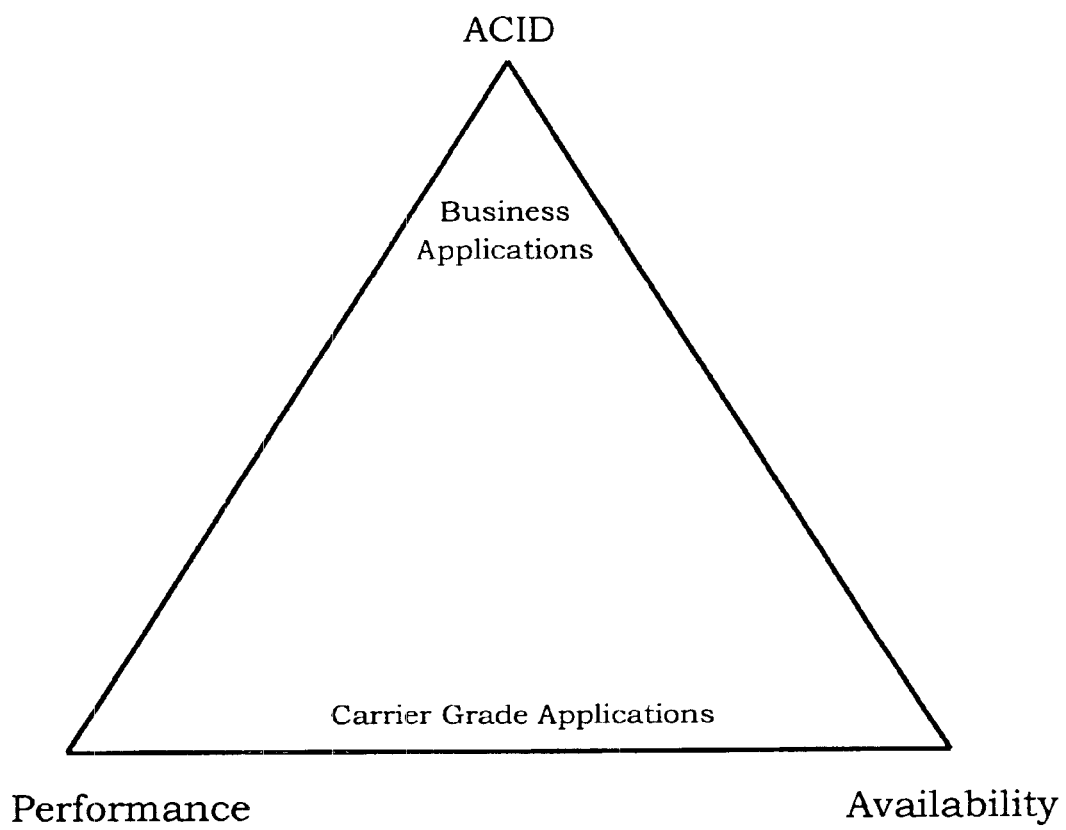
FIG. 1 is a diagram showing the tradeoffs that business and carrier grade applications have to make.
Figure 2:
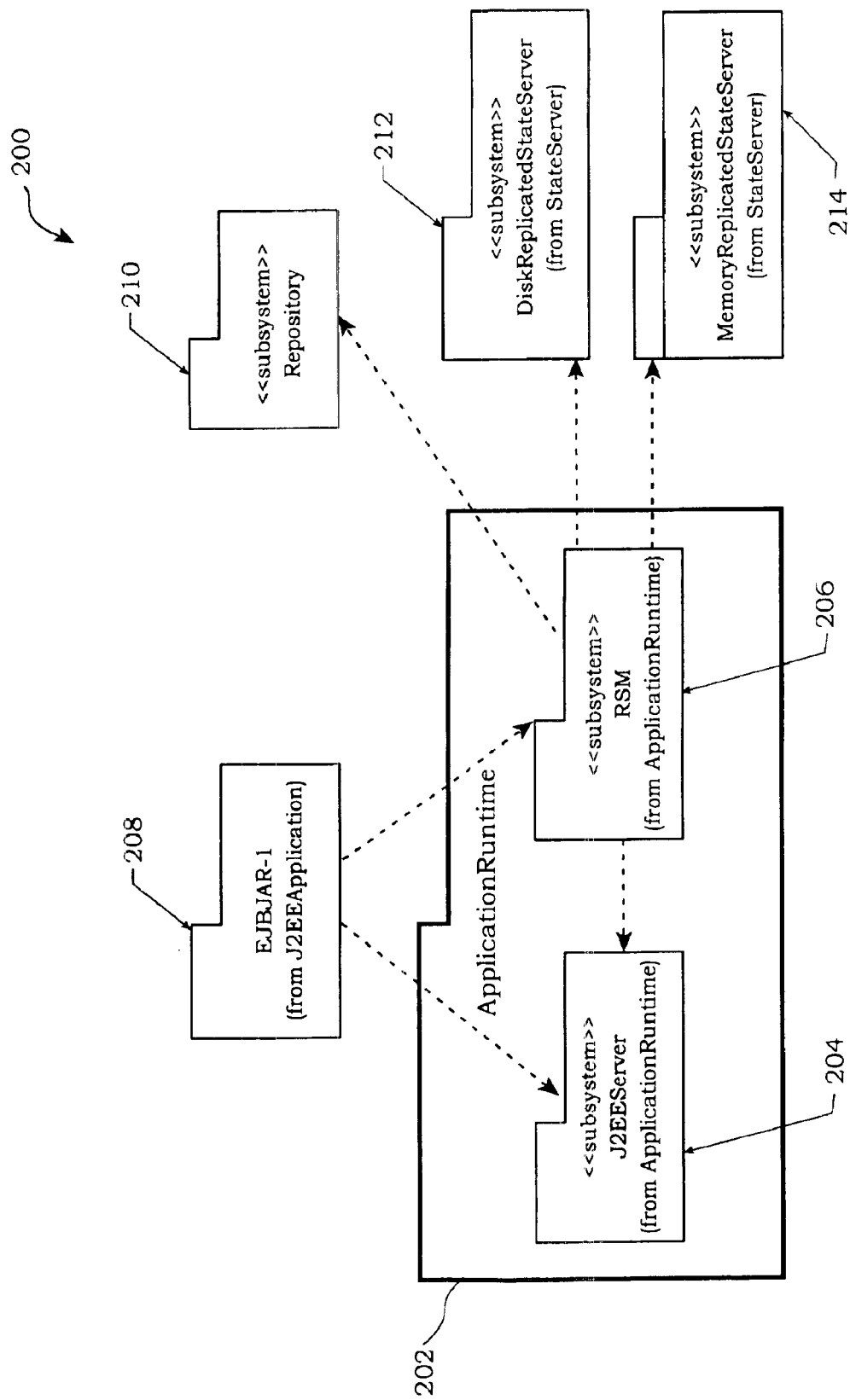
FIG. 2 is a Java system having state management, in accordance with an embodiment of the present invention.

FIG. 1 has been described in terms of the prior art. FIG. 2 is a Java system 200 having state management, in accordance with an embodiment of the present invention. The Java system 200 includes an application runtime subsystem 202 having a Java 2 Enterprise Edition (J2EE ) Server 204 and a replicated state manager (RSM) subsystem 206. Also included in the Java system 200 are a Java application 208, a repository subsystem 210, a disk replicated state server subsystem 212, and a memory replicated state server subsystem 214.

FIG. 2 shows the RSM 206 interfacing with the (J2EE ) Server 204, the Java application 208, the repository 210, the disk replicated state server subsystem 212, and the memory replicated state server subsystem 214. The J2EE Server subsystem 204 provides the runtime environment for J2EE applications, and includes implementations of different types of J2EE containers, such as an application client container, an EJB container, and a web container.

The Repository subsystem 210 stores and manages the software load for the J2EE application 208 and J2EE server 204. During pre-deployment of a J2EE application 208, classes and a deployment descriptor provided by an application developer are loaded into the repository 210, and later, loaded on to a J2EE server 204 to make the application 208 operational.

State server subsystems store and manage the replicated state for the J2EE application 208, which makes an application highly available. During application runtime, the RSM 206 replicates the replicated state to a state server. If the application 208 running on the J2EE server 204 fails, the application 208 restarts after failure by recovering its state from the replicated state server. The Java system 200 provides two types of state servers, a memory replicated state server 214 and a disk replicated state server 212. The memory replicated state server 214 stores the replicated state in an inmemory database, while disk replicated state server 212 uses a disk-based database to store and manage the replicated state.

As shown in FIG. 2, the RSM subsystem 206 is part of the J2EE Application Runtime subsystem 202, which is responsible for management and supervision of running the J2EE application 208. The RSM 206 manages the replicated and migration capable state for J2EE applications 208 that are running on a J2EE server 204. By managing application state, the RSM 204 provides support for online application upgrades, failure recovery and load balancing features of the J2EE system 200. The RSM 206 uses a memory database within a J2EE server process 204 to manage the application state. In this manner, the RSM enables an application to remain operational even if the state servers become temporary unavailable.

Figure 3:
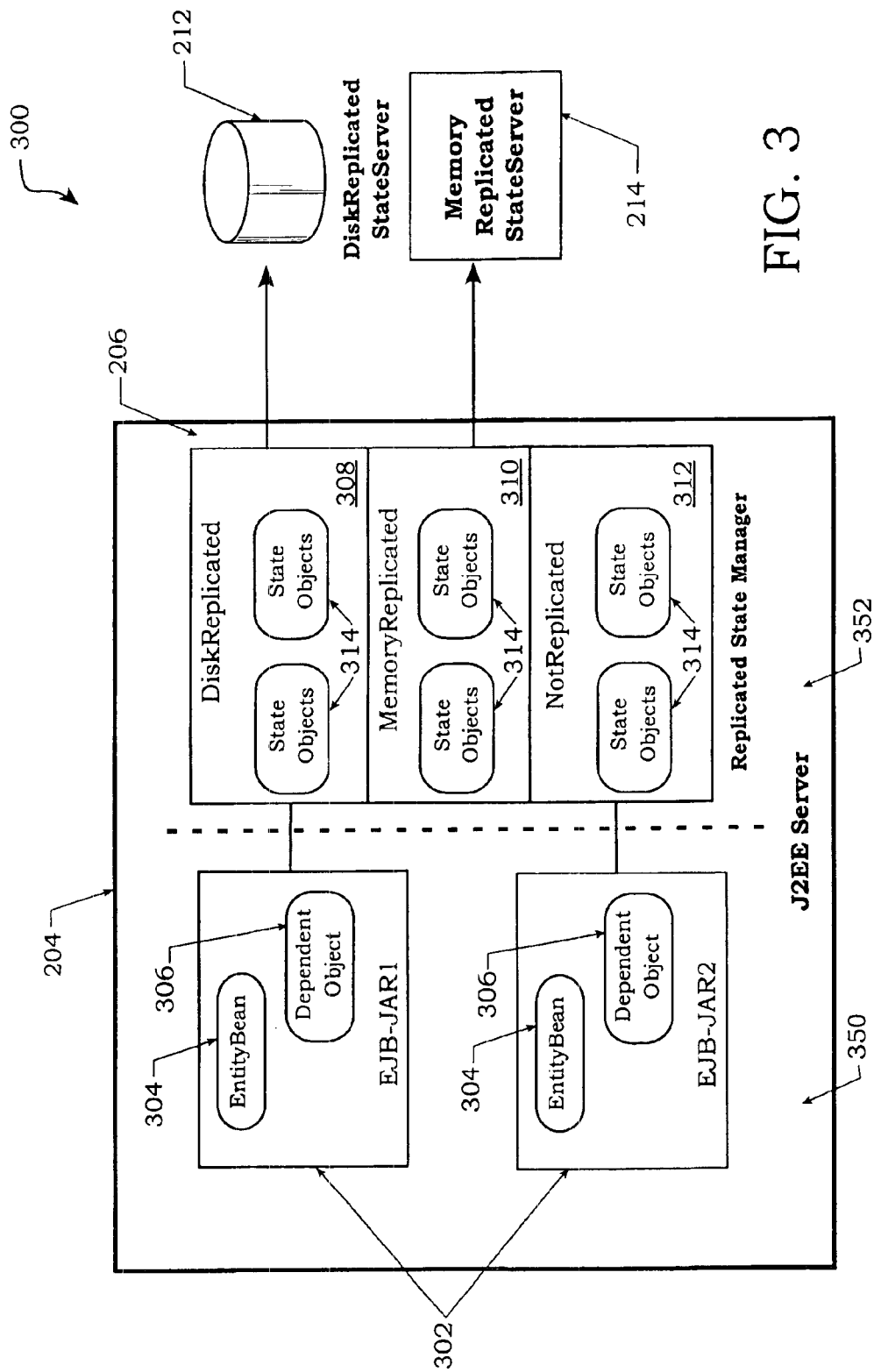
FIG. 3 is a block diagram showing replicated state subsystems, in accordance with an embodiment of the present invention.

FIG. 3 is a block diagram showing replicated state subsystems 300, in accordance with an embodiment of the present invention. The replicated state subsystems 300 show a J2EE server 204 in communication with a disk replicated state server 212, and a memory replicated state server 214. Based on the CMP model, the application developer develops a set of entity beans 304 for an application and specifies the relationships between these objects. For each entity bean 304, the application developer specifies an abstract schema that defines a set of methods for accessing the container-managed fields and relationships for the entity bean. These container-managed fields and relationships are specified in the deployment descriptor defined by the application developer.

Each entity bean 304 includes an abstract class, a local and/or remote interface that defines bean's client-view business methods, a home interface that defines create, remove, home and finder methods. The abstract schema includes a set of properties, with each property representing a field or relationship in the container-managed state of the entity bean 304. The entity bean 304 also defines a set of setter and getters methods for the container-managed fields and relationships. The application developer codes state access and modifications using the setter and getter methods defined for the container-managed fields and relationships.

The EJB 2.0 CMP specification sets forth, without specific implementations, goals for a persistence manager that provides management of persistent state and relationships for the entity beans 304. The embodiments of the present invention provide specific methods for state management that achieve the goals set forth by the EJB 2.0 CMP specification. Specifically, the RSM of the embodiments of the present invention is a carrier-grade J2EE specific implementation of a persistence manager facility.

However, instead of mapping an abstract schema to a database-based persistence mechanism, RSM manages the state of entity beans 304 and dependent objects 306 using an in-memory state management facility. This in-memory state manager runs within a J2EE server process. To support state recovery during an application restart and migration, the RSM actively replicates the in-memory state to disk replicated state servers 212 and/or memory replicated state servers 214.

FIG. 3 shows two EJB modules 302 deployed on a J2EE server process 204. Each EJB module 302 includes a set of entity beans 304. The RSM defines a separation between the application part 350 and managed state part 352.

The application part 350 includes abstract entity bean object classes 304 provided by application developer, based on the EJB 2.0 CMP model. The application part 350 also includes concrete implementation classes generated by the RSM. Further, the application part 350 provides the implementation of methods that provide the state transition logic for a J2EE application.

The Managed state part 352 includes the state objects 314 that capture the state of entity beans 304. The separation of state between application part 350 and managed state part 352 enables the RSM to support both application upgrade and migration. The RSM of the embodiments of the present invention can generate concrete implementation classes for entity beans 304. The concrete classes generated by the RSM are responsible for managing the recoverable state of the entity beans 304. The RSM also provides implementation of collection classes that are used in managing container-managed relationships. By providing implementation of the getter and setter methods of the corresponding abstract classes, the RSM can implement the entity bean 304 classes. The RSM can also manage the mapping between primary keys and EJB objects, and can store the recoverable references to the remote and home interfaces of other EJBs.

The RSM further manages the relationships between entity beans 304. This includes maintaining the referential integrity of the container-managed relationships in accordance with the semantics of the relationship type.

The RSM manages the recoverable state of entity bean 304 based on the type of the state. Depending on the type of state, the RSM replicates the state in either a disk replicated state server 212 or a memory replicated state server 214. In addition, the RSM makes application state capable of migration from one J2EE server process 204 to another J2EE server process.

The RSM supports checkpoints of the recoverable state to the two types of state servers, namely, the disk replicated state server 212 and the memory replicated state server 214. This includes support for connecting to the servers, sending checkpoints, recovering replicated state and merging the recovered state into existing in-memory state. Further, the RSM recovers the replicated state from the state servers during application restart after a failure or shutdown or during migration of EJB module from one J2EE server process to another.

During pre-deployment of an EJB module 302, the RSM maps the abstract schema of entity beans 304 classes to a physical schema used by the RSM. To perform this form of schema mapping, the RSM can use a deployment descriptor of EJB components. The RSM generates concrete implementations for the entity bean 304 classes defined as abstract classes by the application developer. A concrete implementation class includes the code that implements the setter and getter methods for container-managed fields and relationships based on the RSM mechanism.

The embodiments of the present application allow state managed by the RSM for a J2EE application to be partitioned into multiple state partitions. In some embodiments of the present invention a state partition defines a unit of concurrency. In these embodiments, the RSM serializes access to a state partition from concurrent transactions. For example, using this embodiment, if a J2EE application includes multiple entity beans having states managed as part of a single state partition, then only a single transaction can be active across the entity bean instances in this state partition at any particular instance.

During application design, application designer partitions the replicated and migration capable state of an application using State Management Units of different types and State Partition. Such state partitioning may be specified using an application configuration descriptor or done dynamically through control module. The repository maintains a representation for the static partitioning of state using schema archives. Schema archives are described in greater detail in U.S. patent application Ser. No. 09/818,214, filed Mar. 26, 2001, and entitled "Method and Apparatus for Managing Replicated and Migration Capable Session State for A Java Platform," which is incorporated herein be reference in its entirety.

RSM partitions entity beans based on the range of primary keys that will be served by different state partitions. From example, account 1 to 100 will be managed within a single state partition 1, while account 101 to 200 will be managed in a separate state partition 2. A state partition also identifies the unit of concurrency. J2EE server process and RSM serialize transactional access to a state partition. At any specific instance, there can be only one transaction active on entity beans within a state partition.

After partitioning state in to State Partitions, application designer partitions each state partition in to multiple State Management Units. A state partition can contain multiple state management units (SMU) of different types.

Figure 4:
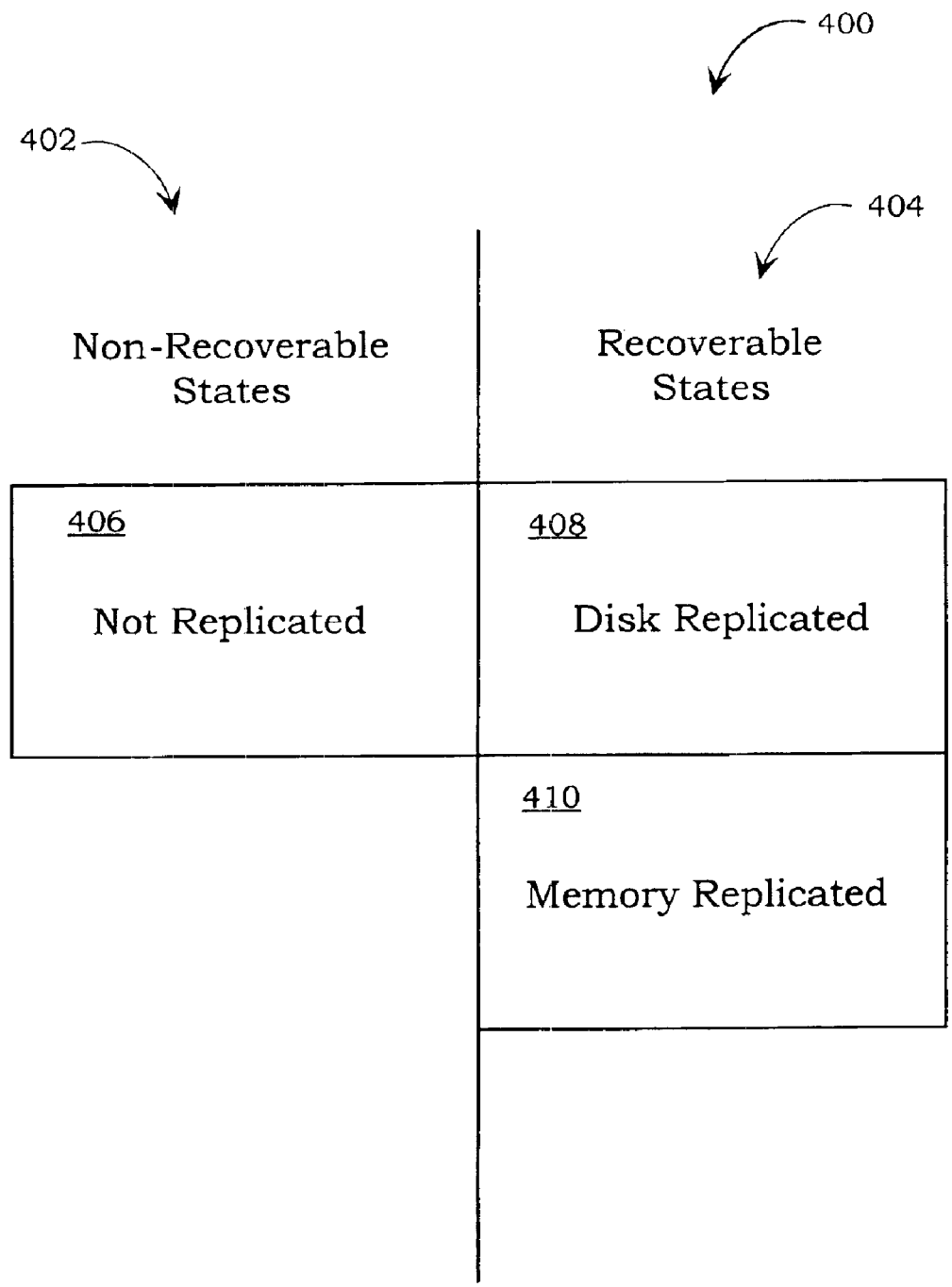
FIG. 4 is a diagram showing state management types for state management units (SMU), in accordance with an embodiment of the present invention.

FIG. 4 is a diagram showing state management types 400 for state management units (SMU), in accordance with an embodiment of the present invention. The state management types 400 are divided into a non-recoverable state 402 and recoverable states 404. The non-recoverable state 402 includes a non-replicated state 406. The recoverable states include a disk replicated state 408 and a memory replicated state 410.

A SMU is a collection of state objects 314 with the same state management type 400, and further defines a unit of checkpoints for the recoverable state types 404. An application can include multiple SMUs of different types depending on the specific requirements of the application. The RSM replicates a disk replicated SMU 408 to a disk replicated state server. The RSM is then capable of automatically recovering the disk replicated SMU 408 during an application restart after failure, shutdown or migration.

The RSM replicates a memory replicated SMU 410 to a memory replicated state server, and is then capable of automatically recovering memory replicated SMU 410 during an application restart after failure, shutdown or migration. The not replicated SMU 406 is not replicated by the RSM to either a disk replicated state server or a memory replicated state server. Generally, the RSM manages a non-replicated SMU 406 to support the migration state of a J2EE application from one J2EE server process to another.

Figure 5:
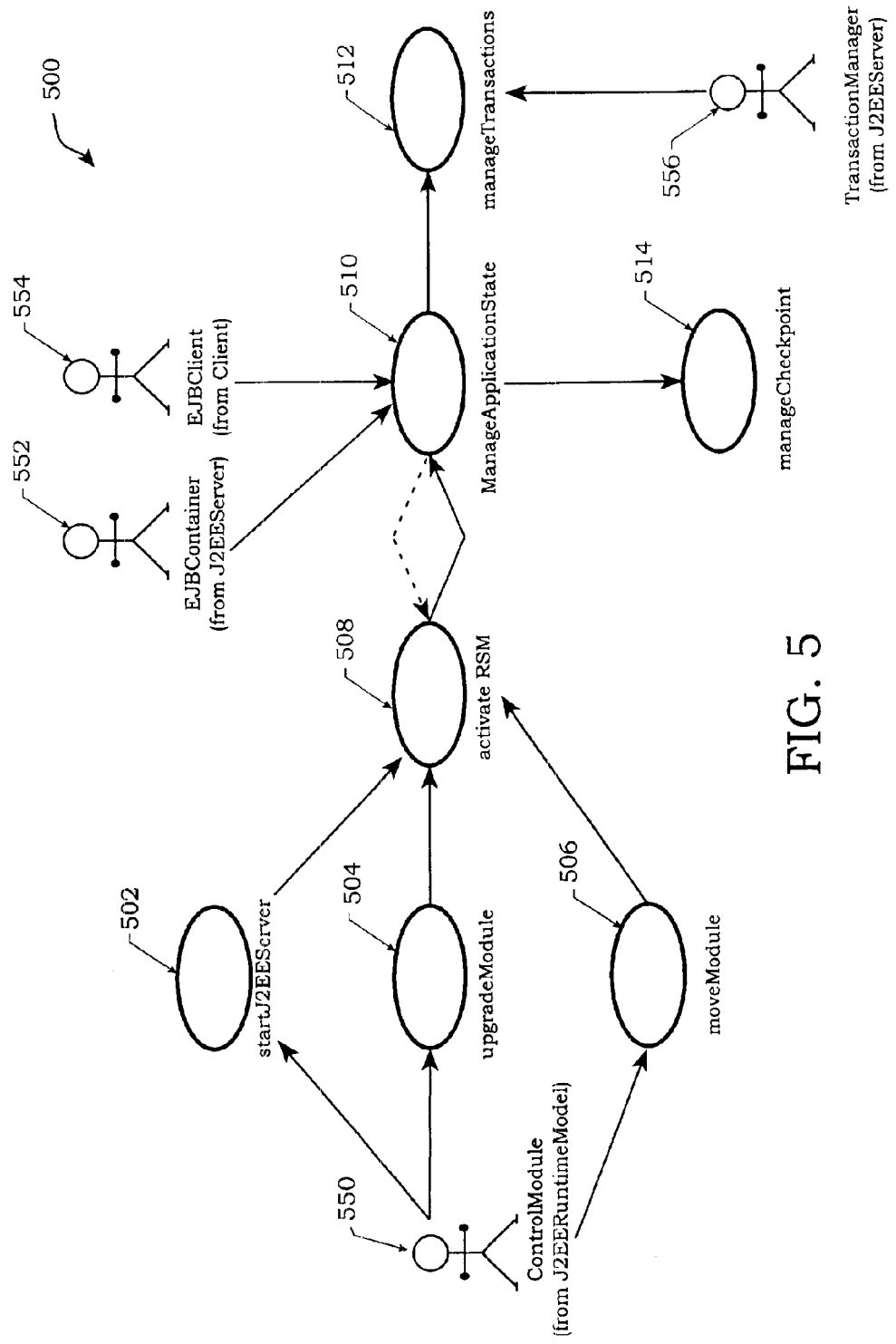
FIG. 5 is an illustration showing a hierarchy of use operations for an RSM, in accordance with an embodiment of the present invention.

FIG. 5 is an illustration showing a hierarchy of use cases 500 for an RSM, in accordance with an embodiment of the present invention. During application runtime, a Control Module 550, an EJB Container 552, a Transaction Manager 556, and an EJB Client 554 are the actors that drive use cases for the RSM.

The control module 550 is a part of a Java application that provides control and application-specific policies for the application. The control module 550 is described in greater detail in related U.S. patent application Ser. No. 09/812,536, filed Mar. 19, 2001, and entitled "Method and Apparatus for Providing Application Specific Strategies to a Java Platform including Start and Stop Policies," which is incorporated by reference in its entirety. The control module 550 is responsible for supervising the J2EE server 204 and the EJB modules at application runtime. Since the RSM is part of application runtime for a J2EE server process 204, J2EE server 204 activates the RSM as part of the start J2EE server process 502, the upgrade module process 504, and the move module process 506. The control module 550 interacts with the J2EE server 204, which in turn drives uses cases for RSM.

The EJB client 554 invokes a method on an entity bean that has its state managed by the RSM using a manage application state process 510. Such method invocation generally happens under a transaction, and drives the RSM to manage any changes to the entity bean's state as part of the invocation. The EJB container 552, which is part of J2EE server 204, intercepts the method invocation to inject its services, for example, the container 552 can start a transaction that brackets a method invocation. After injecting its services, the container 552 dispatches method invocation to the target entity bean instance. The EJB container 552 interfaces with the RSM to drive the manage transactions use case 512, the manage application state use case 510, and the manage checkpoints use case 514. Finally, the transaction Manager 556 manages transactions for the RSM, which acts as a transactional resource manager.

The RSM uses the manage application state use case 510 to manage state for an EJB-based application. The RSM acts as a carrier-grade implementation of the persistence manager facility defined in the EJB 2.0 specification. CMP model uses the RSM to manage replicated and migration-capable state for entity bean.

Initially, the EJB client 554 makes an invocation on a method defined as part of the remote or local interface of the target entity bean. Typically, a method invocation maps to a state transition implemented by the entity bean. Based on the CG J2EE programming model, a method invocation on an entity bean can be either local or distributed, synchronous or asynchronous, but preferably does not have any affect on how the RSM manages state for an invoked entity bean instance.

The EJB container 552 then intercepts the method invocation from the EJB client. The EJB container 552 uses this interception to inject container-specific services, such as, transaction bracketing and security mapping. As part of the method implementation, abstract entity bean classes provided by the application developer invoke setter and getter methods for container-managed fields and relationships. A concrete implementation class is then generated by the RSM and implements the setter and getter methods. This enables the RSM to manage the state of container-managed fields and relationships as part of its implementation. The RSM manages the state of entity beans using an inmemory state management facility, which runs within a J2EE server process.

When an entity bean undergoes state transitions initiated by a client application, the application changes the state objects. Any changes to the managed state part are tracked by the RSM. Depending on the state management requirements specified for a J2EE application, the RSM replicates the state objects to disk replicated and memory replicated state servers.

The RSM uses the manage checkpoint process 514 to manage checkpoints of replicated state, and then issues checkpoints to the state servers. More specifically, the RSM implements a checkpoint mechanism that is configurable using a checkpoint policy, which can be specified by the application Control Module 550. The RSM then uses the checkpoint mechanism to replicate state to the disk replicated state server and the memory replicated state server.

The RSM can issue checkpoints at different points, such as at the successful commit of each transaction. Generally, no checkpoint is issued for a transaction that fails to commit and is rolled back. This ensures that the state is replicated to state servers for only committed transactions leading to consistent recovery after failure, migration or shutdown. The RSM can optimize the checkpoint mechanism by combining transactions from successful commits of multiple transactions, and maintaining a sequence of box-carried checkpoints. This is referred to as boxcarring of checkpoints for multiple transactions.

Further, the checkpoint can be issued either synchronously or asynchronously. The synchronous checkpointing increases the reliability associated with the checkpointing mechanism. The state server ensures that checkpoints propagated to it are processed, thereby avoiding any potential loss of checkpoints. The replicated state in the state servers stays identical with the in memory state managed by RSM, ensuring a faster recovery during the failover.

In the asynchronous checkpoint mechanism, the RSM on the J2EE server process can enqueue checkpoints on a local message queue, thus the checkpoint messages are placed in the local address space before getting dispatched. The checkpoint operation returns immediately after the enqueuing operation allowing the on-going transaction to complete.

The message queue takes the responsibility of delivering the checkpoint messages to the state server at some time later after the transaction has been successfully committed. Preferably, the message queue preserves the ordering of the checkpoint messages in the order that transactions were executed on the application.

Asynchronous checkpointing adds more flexibility to the state replication mechanism. Based on the checkpointing policy, the message queue can take decision to propagate asynchronous checkpoints at different intervals-after each committed transaction, after a set of committed transactions or after a defined time interval.

Figure 6:
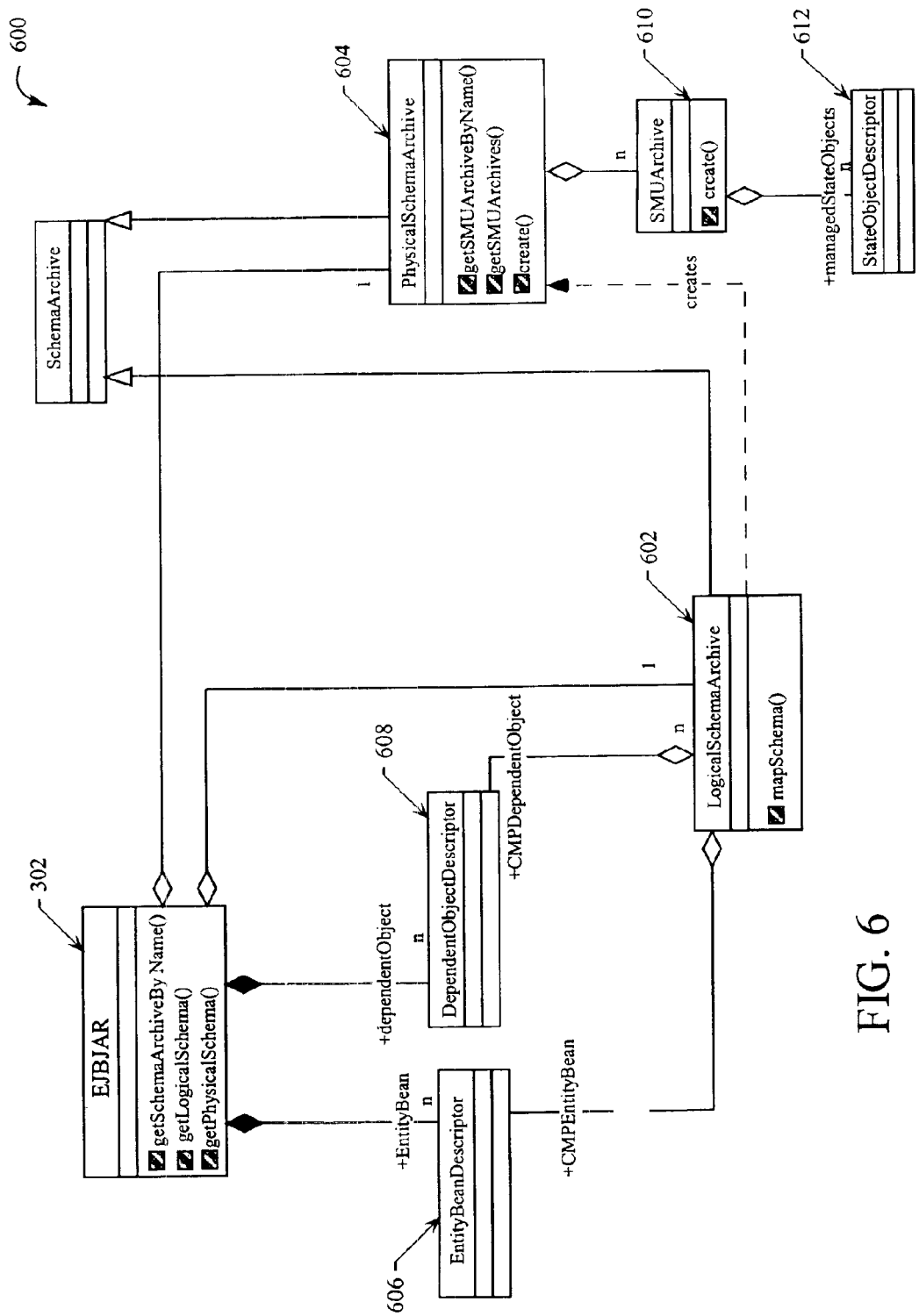
FIG. 6 is a class diagram showing repository interfaces used by the RSM, in accordance with an embodiment of the present invention.

FIG. 6 is a class diagram showing repository interfaces 600 used by the RSM, in accordance with an embodiment of the present invention. The repository maintains classes and configuration descriptors that represent partitioning of state for a J2EE application. The repository interfaces 600 includes EJB modules 302, a logical schema archives 602, a physical scheme archives 604, entity bean classes 606, SMU archives 610, and state object classes 612.

The RSM maintains both a logical schema archive 602 and a physical schema archive 604 for each EJB module 302, which are populated in the repository 210 during pre-deployment of an EJB module 302. More specifically, during pre-deployment of the EJB module 302, the RSM creates a logical schema archive 602 in the repository, which includes abstract classes for entity beans 606. The logical schema archive 602 also includes concrete implementation classes that are generated by the RSM. The RSM maps the logical schema archive of a pre-deployed J2EE application to the application part at runtime.

The physical schema archive 604 includes the state object classes 612 and RSM-generated artifacts used for the managed state part of a J2EE application The SMU archive 610 groups state object classes 612 based on the state management type. Multiple SMU archives 610 can be included within a physical schema archive 604. Both logical and physical schema archives are loaded in the repository as part of application software load.

Figure 7:
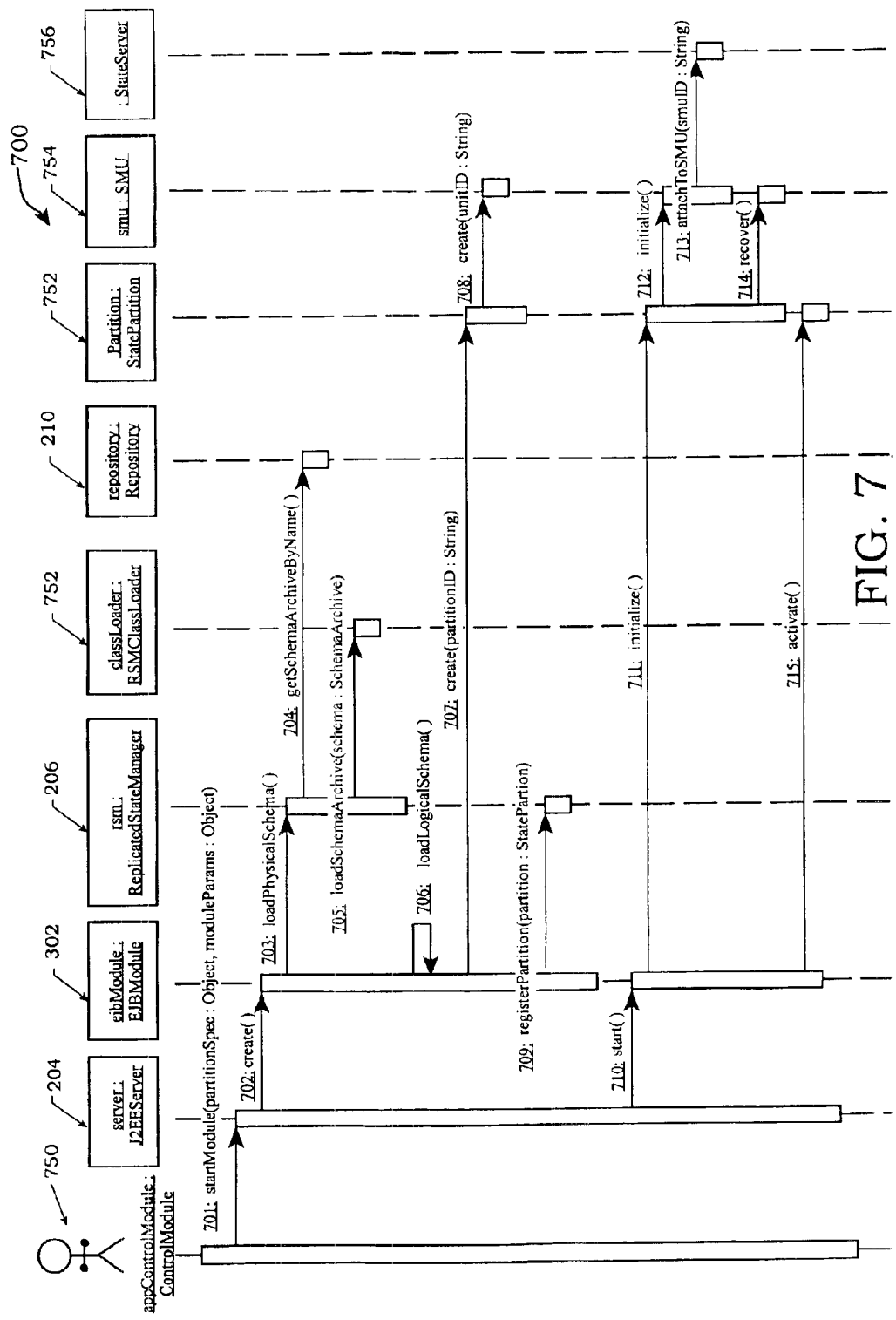
FIG. 7 is a sequence diagram showing an initialize EJB module state sequence, in accordance with an embodiment of the present invention.

FIG. 7 is a sequence diagram showing an initialize EJB module state sequence 700, in accordance with an embodiment of the present invention. The EJB module state sequence 700 illustrates how an RSM for an EJB module is started. In operation 701 and 702, the control module 750 for an application starts up an EJB module 302 on a J2EE server process 204. An EJB module 302 may need to be initialized because the EJB module 302 is being started on a J2EE server process 204 after application failure or shutdown, or because the EJB module 302 has been migrated from one J2EE server process 204 to another. The EJB module 302 then requests to the RSM 206 to load the physical schema archive for the EJB module 302, in operation 703.

In operation 704, the RSM 206 loads the physical schema archive from the repository 210, and in operation 705 the RSM 206 loads the schema archive using the RSM class loader 752. In operations 707–713 the RSM creates state partitions 752 and SMUs 754 based on the specification provided by the application control module 750. State Partitions and SMUs can be either created statically using partition configuration descriptor loaded from the repository or managed dynamically by the control module 750. This diagram shows the creation of partitions and SMU based on the specification provided by the application control module 750. Then, in operations 714 and 715 the RSM 206 recovers any replicated state for this EJB module and its set of SMUs from the two state servers.

Figure 8:
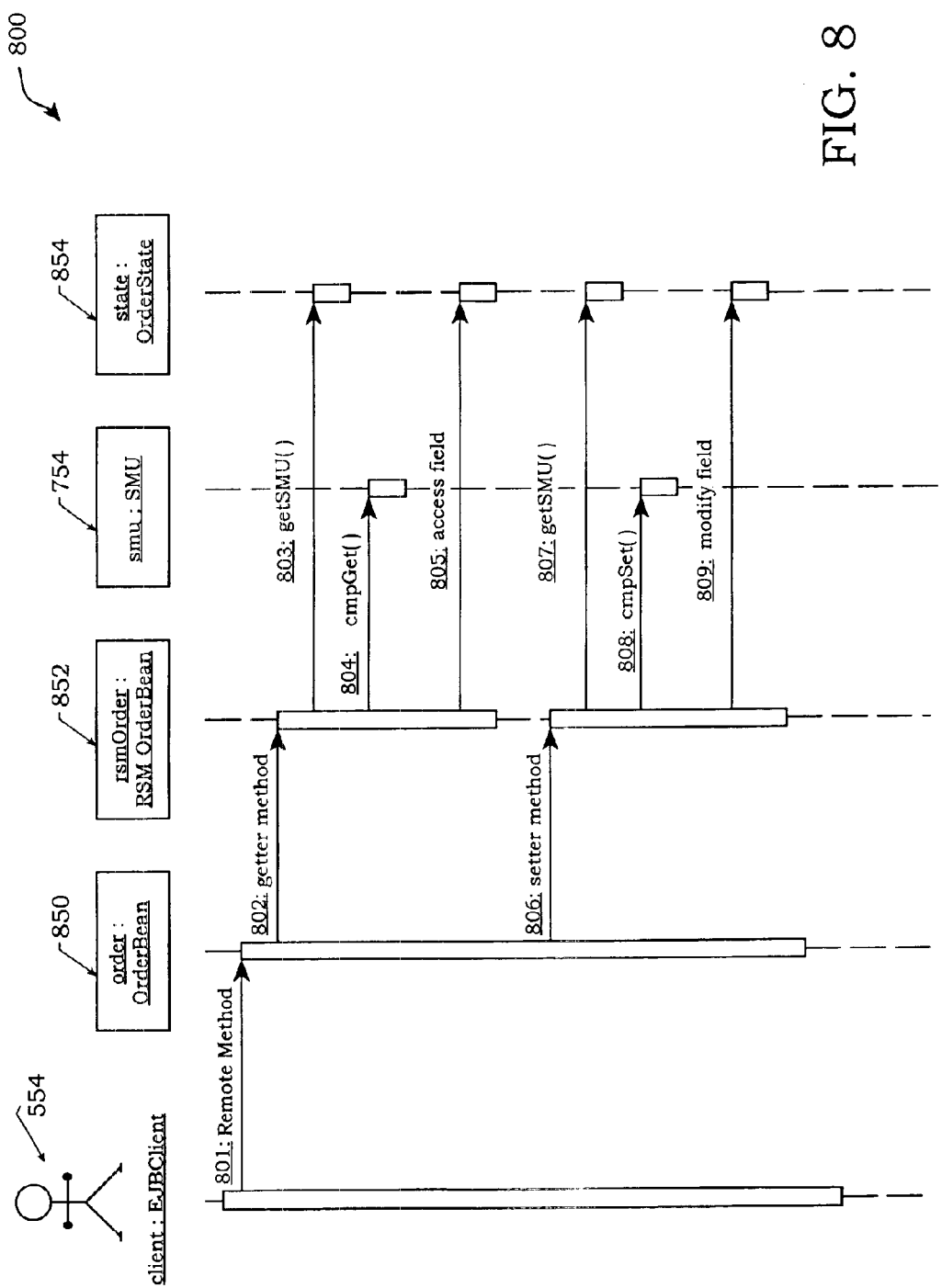
FIG. 8 is a sequence diagram showing a manage state sequence, in accordance with an embodiment of the present invention.

FIG. 8 is a sequence diagram showing manage state sequence 800, in accordance with an embodiment of the present invention. The manage state sequence 800 illustrates a well-defined contract between an RSM_OrderBean 852, which is a concrete implementation class, and an OrderState 854, which is a subtype of state object. The contract illustrated by the manage state sequence 800 is defined by an EJB_RSM Contract interface that is implemented by the SMU 754, which includes the state objects.

In operation 801, an EJB client 554 makes an invocation on a method defined as part of the remote interface (or local interface) of the target entity bean. Typically, a remote method maps to a state transition implemented by the entity bean. As mentioned previously, a remote method invocation on an entity bean can be either synchronous or asynchronous. The type of method invocation generally does not have an affect on how the RSM manages state for an invoked entity bean instance.

In operation 802, the abstract entity bean class order bean 850, which is provided by the application developer, invokes a getter method for container-managed fields and relationships. In response, the concrete implementation class RSM_OrderBean 852, which is generated by the RSM, implements the getter method, in operations 803–805.

In operation 806, the abstract entity bean class order bean 850 invokes a setter method for container-managed fields and relationships. In response, the concrete implementation class RSM_OrderBean 852 implements the setter method, in operations 807–809. In this manner, the RSM is able to manage state of container-managed fields and relationships as part of its implementation. In the manage state sequence 800, the RSM_OrderBean 852 uses the OrderState 854 state object to maintain container-managed fields for the OrderBean 850. In addition, the OrderState 854 maintains the relationships of the OrderBean 850 with other entity beans.

The RSM 206 uses each SMU instance to track changes to the state objects during a transaction. Each SMU acts as a unit of checkpoint based on its state management type. At transaction commit time, based on the transaction policy, the RSM 206 issues checkpoint for each SMU (and containing State Partition) that participated in the ongoing transaction. The RSM uses the SMU to extract delta of state changes that needs to be checkpointed.

Figure 9:
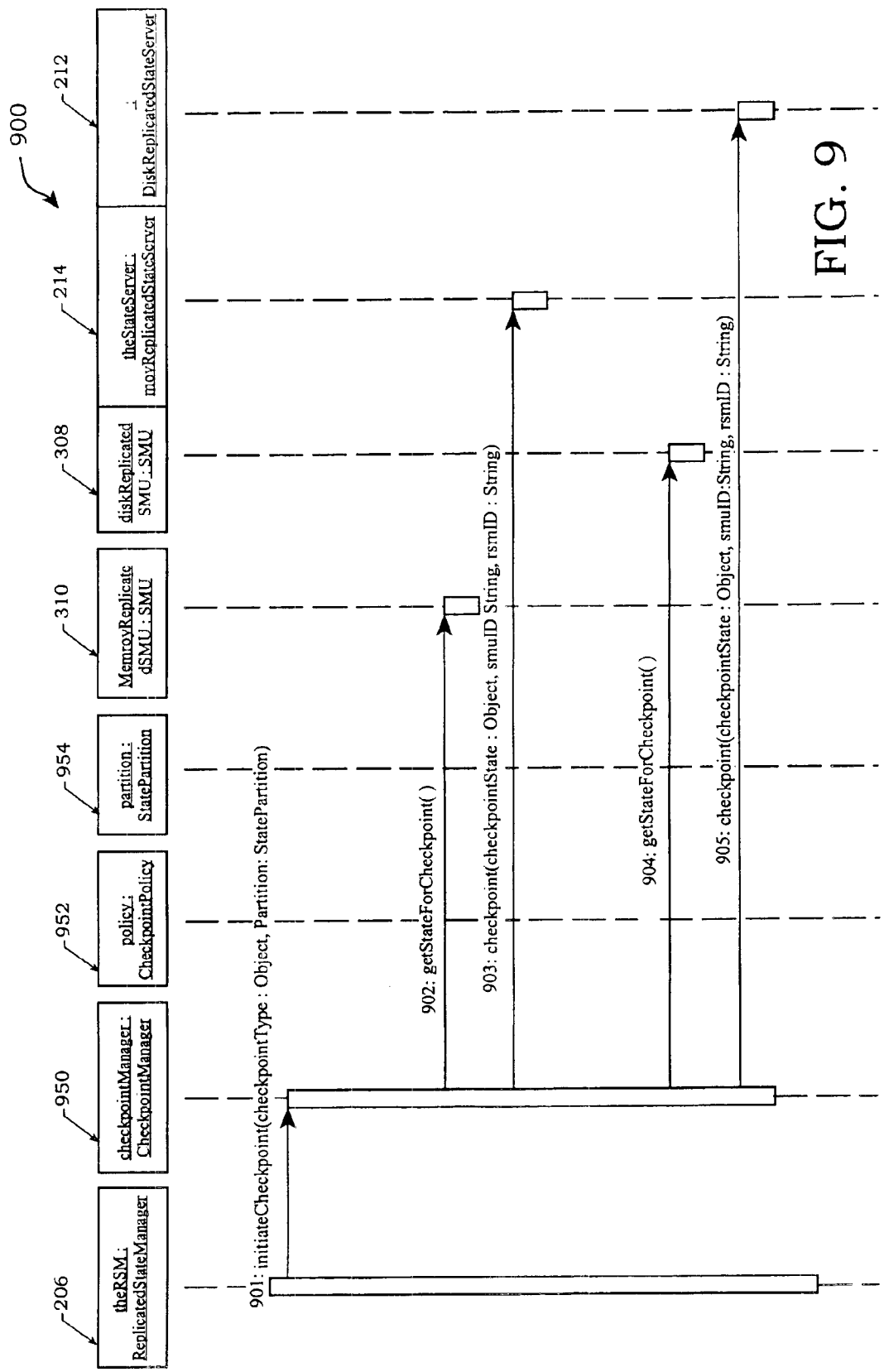
FIG. 9 is a sequence diagram showing a checkpoint managing sequence, in accordance with an embodiment of the present invention.

FIG. 9 is a sequence diagram showing a checkpoint managing sequence 900, in accordance with an embodiment of the present invention. Broadly speaking, when the RSM 206 decides that checkpoint needs to be issued for a set of SMUs, the RSM 206 delegates to a Checkpoint Manager 950 to issue the checkpoints. The Checkpoint Manager 950 extracts the checkpoint state from a SMU and then sends the checkpoint to one of the state servers depending on the type of SMU.

More specifically, for each state partition 954 that participated in a particular transaction with a pending checkpoint, the RSM 206 delegates a Checkpoint manager 950 to issue the checkpoint, in operation 901. In response, the checkpoint manager 950 extracts the checkpoint state from the memory replicated SMUs 310 for each SMU of memory replicated type, in operation 902. The Checkpoint manager 950 then sends the checkpoint to the memory replicated state server 214, in operation 903. In a similar manner, the checkpoint manager 950 extracts the checkpoint state from the disk replicated SMUs 308 for each SMU of disk replicated type, in operation 904, and sends the checkpoint to the disk replicated state server 212, in operation 905.

As mentioned previously, the present invention allows migration of an application and the managed application state across J2EE server processes. For example, when load balancing a J2EE system, an application's control module can request the system to move a module from one J2EE server to another J2EE server located on a different node that has some spare CPU capacity using move module functions. In these situations, both the module and managed state for that module can be migrated to other J2EE processes.

Figure 10:
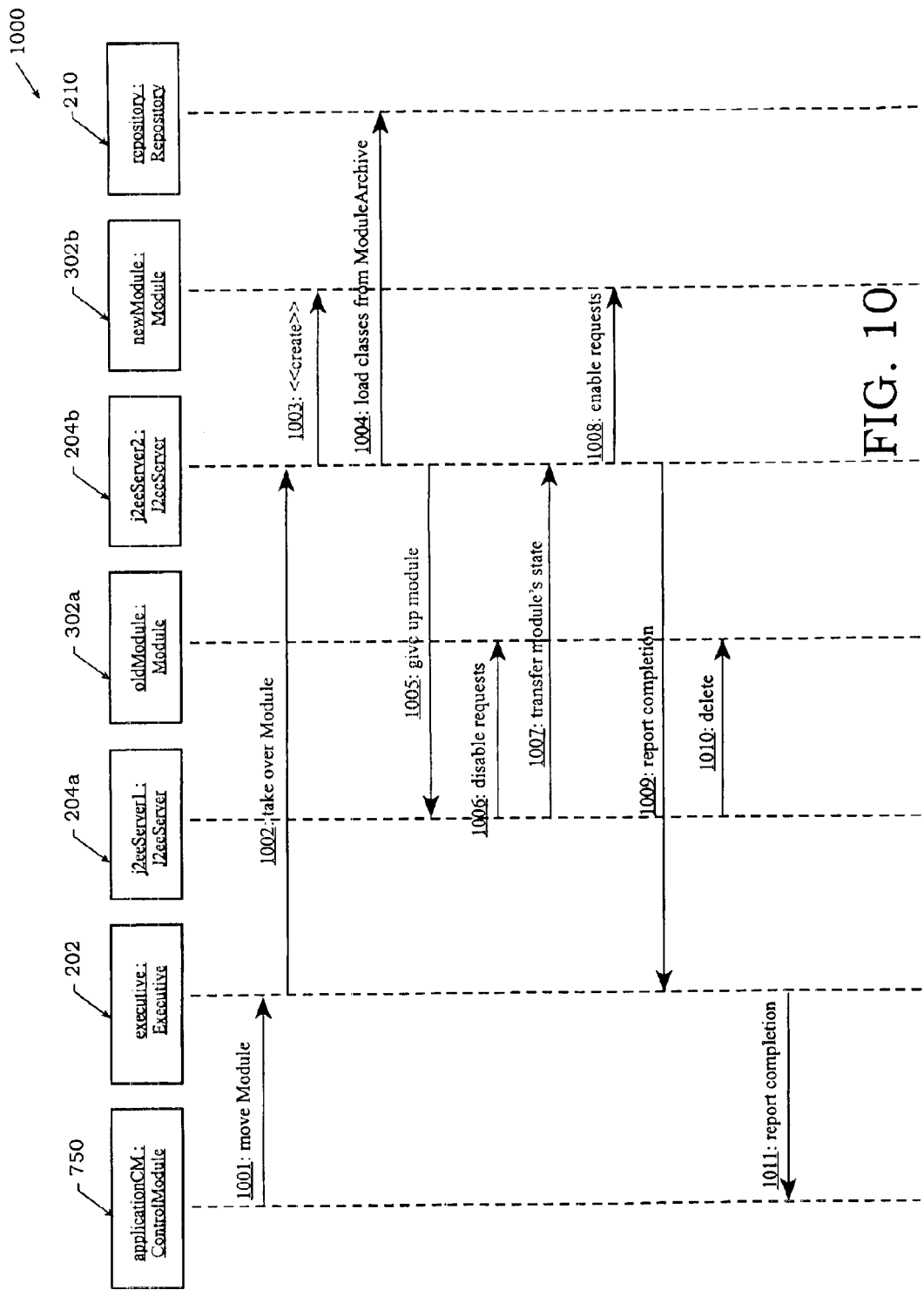
FIG. 10 is a sequence diagram showing a module move sequence, in accordance with an embodiment of the present invention.

FIG. 10 is a sequence diagram showing a module move sequence 1000, in accordance with an embodiment of the present invention. The module move sequence 1000 illustrates how an application's control module 750 moves a service module 302a from a first J2EE server 204a to a second J2EE server 204b.

Initially, in operation 1001, the control module 750 requests the executive 202 to move a first service module 302a from the first J2EE Server 204a to the second J2EE Server 204b. In response, the executive 202 requests the second J2EE Server 204b to take over the allocation of the first service module 302a, in operation 1002. To begin the take over, in operation 1003, the second J2EE Server 204b creates a second service module 302b object and allocates the resources for it. The second J2EE Server 204b then loads the second service module's 302b class files from the repository 210, in operation 1004.

When code for the second service module 302b is ready, in operation 1005, the second J2EE Server 204b requests the first J2EE Server 204a to give up allocation of the first service module 302a In response to the request, the first J2EE Server 204a disables applications' requests to the first service module 302a, in operation 1006. The system will then hold all requests to the first service module 302a. The first J2EE Server 204a then transfers the RSM managed state of the first service module 302a to the second J2EE Server 204b, which then makes the RSM managed state available to the second service module 302b, in operation 1007.

In operation 1008, second J2EE Server 204b enables the second service module 302a to receive requests from other modules and external applications. The second J2EE Server 204b then reports completion to the executive 202, in operation 1009, and the first J2EE Server 204a deletes the first service module 302a in operation 1010. Thereafter, in operation 1011, the executive 202 reports completion to control module 750.

Figure 11:
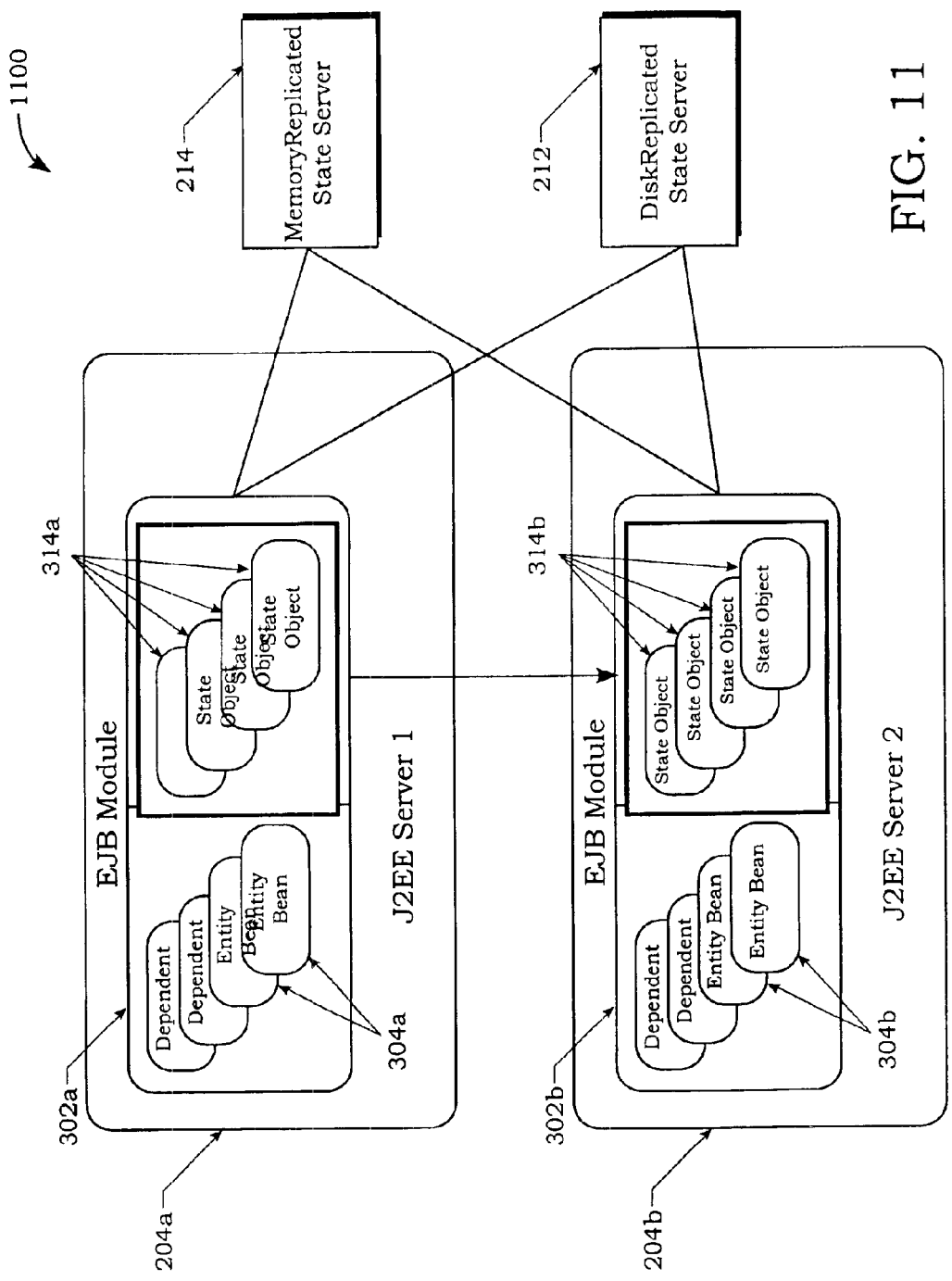
FIG. 11 is a diagram showing a managed state migration, in accordance with an embodiment of the present invention.

FIG. 11 is a diagram showing a managed state migration example 1100, in accordance with an embodiment of the present invention. The managed state migration example 1100 shows a first module 302a executing on a first J2EE server 204a. The fist module 302a includes a plurality of entity beans 304a, each having a managed state stored in a corresponding state object 314a. In addition, the first module 302a is in communication with the memory replicated state server 214 and the disk replicated state server 212, each of which stores the replicated state of the module 302a, depending on the SMU classification of the various entity beans 304a.

To migrate the first module 302a to the second J2EE server 204b, control module (through the executive) 204a requests the second J2EE server 204b to start a second module similar to the first module 302b. The RSM then checkpoints the SMUs for the first module 302a to the state servers 212 and 214. In addition, the RSM prepares the migration-capable non-replicated state of the first module 302a for transfer to the RSM executing on the second J2EE server 204b.

The RSM on the second J2EE server 204b then recovers the replicated state for the second module 302b from the state servers 212 and 214. In addition, the RSM on the second J2EE server 204b obtains the migration-capable non-replicated state for the second module 302b from the RSM executing on the first J2EE server 204a using RSM-specific state transfer protocols.

Figure 12:
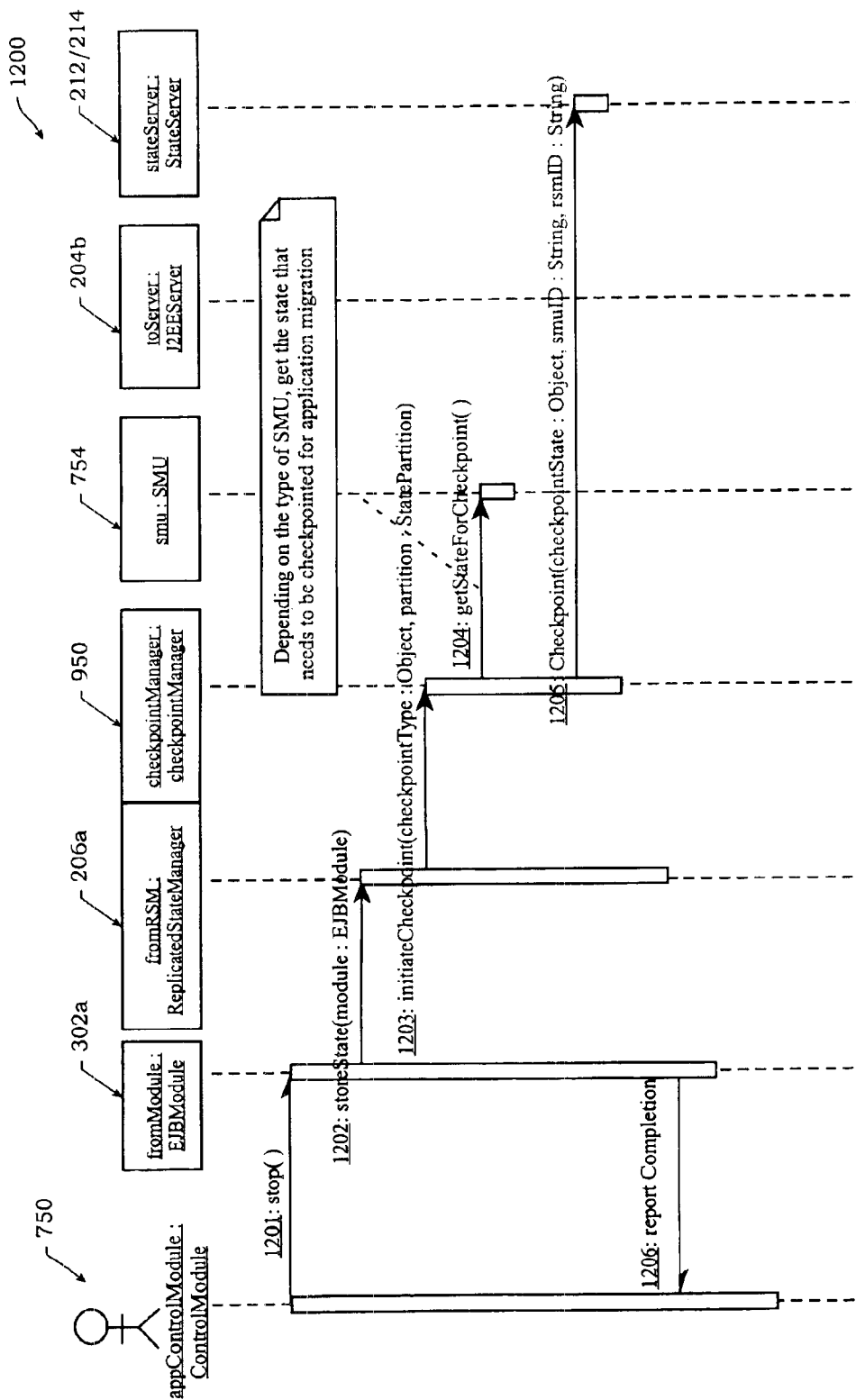
FIG. 12 is a sequence diagram showing a move module state sequence 1200, in accordance with an embodiment of the present invention.

FIG. 12 is a sequence diagram showing a move module state sequence 1200, in accordance with an embodiment of the present invention. The move module state sequence 1200 illustrates how the RSM prepares the managed state for migration from one J2EE server to another. The move module state sequence 1200 is generally initiated in response to a request from the application's control module 750, in operation 1201.

In response, the EJB Module 302a calls a store state function on the first RSM 206a, which is executing on the first J2EE server 206a, to initiate migration of the managed state from the first J2EE server 204a to the second J2EE server 204b, in operation 1202. In operation 1203, the RSM 206a requests the checkpoint manager 950 to issue any pending checkpoints to the state servers for disk replicated and memory replicated SMUs. 212/214. In some case, there may not be any pending checkpoints. The checkpoint manager 950 then manages the checkpointing of the SMUs based on their state management types, in operations 1204 and 1205. RSM also sets the data structure for migration-capable SMUs to initiate transfer of their managed state objects to the migrated J2EE server. The EJB module 302a then reports completion to the application control module 750, in operation 1206. The second J2EE server can then recover the stored state, as described in greater detail subsequently with respect to FIG. 13.

Figure 13:
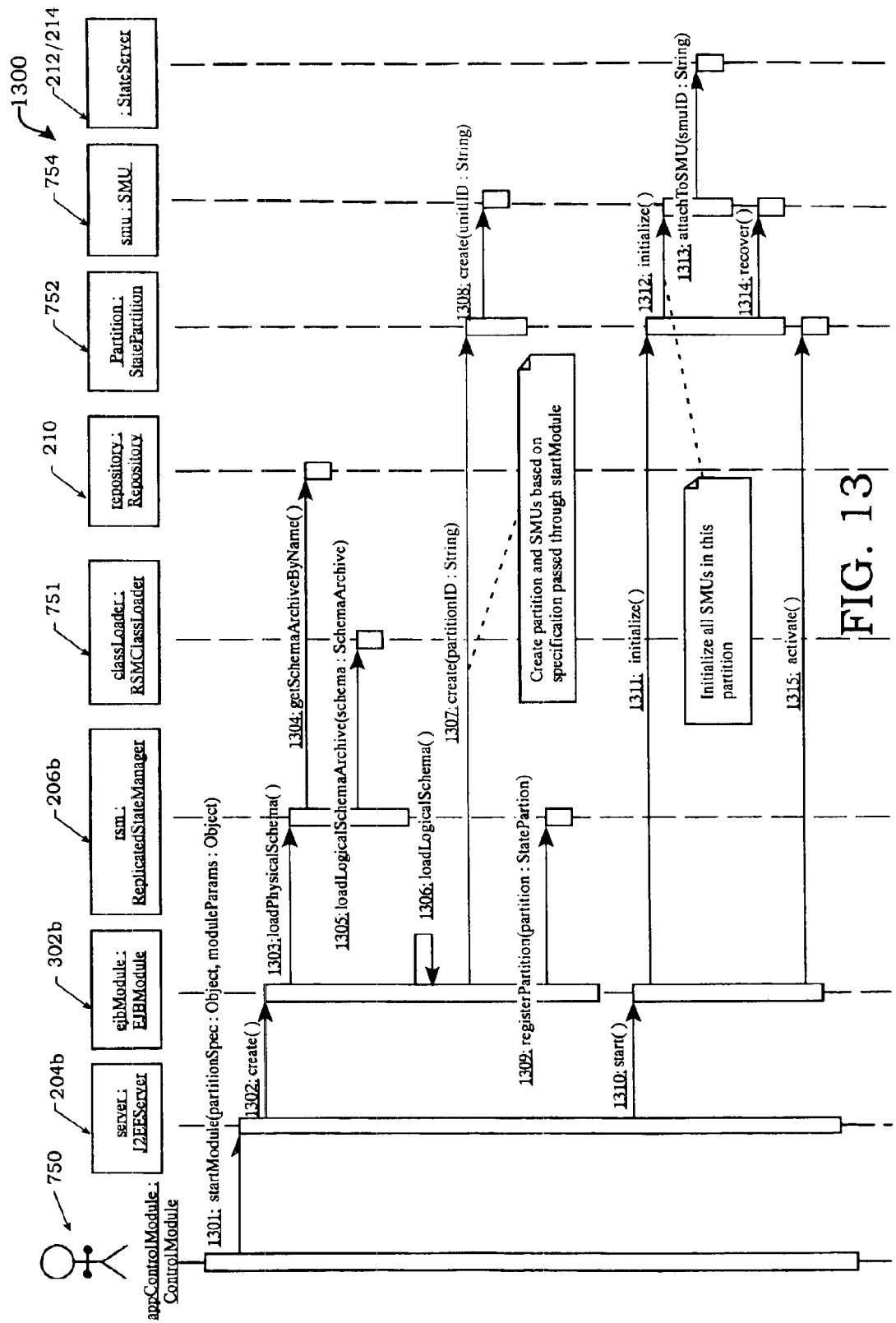
FIG. 13 is a sequence diagram showing an initialize state sequence, in accordance with an embodiment of the present invention.

FIG. 13 is a sequence diagram showing an initialize state sequence 1300, in accordance with an embodiment of the present invention. The initialize state sequence 1300 illustrates how the RSM on a J2EE server receiving a migrated EJB module initializes the managed state of the migrated EJB module. The initialize state sequence 1300 is initiated when a control module 750 requests the second J2EE server 204b to start the migrated module 302b, in operation 1301.

In response, the J2EE server 204b creates a second EJB module 302b, in operation 1302. The second EJB module 302b then requests the RSM 206b to load the physical schema for the second EJB module 302b, in operation 1303. In response, the RSM 206b obtains the schema archive from the repository 210, in operation 1304, and loads the classes for the physical schema from the class loader 751, in operation 1305. The EJB module 302b then loads the logical schema, in operation 1306.

Based on the specification passed through the start module call in operation 1301, the EJB module 302b requests the state partition 752 to create the state partitions, in operation 1307. In response, the state partition 752 creates the requested SMUs 754, in operation 1308, and the EJB module 302b registers the partitions with the RSM 206b, in operation 1309.

In operation 1310, J2EE server 204b requests the EJB module to begin operation. In response, the EJB module 302b requests the state partition 752 to initialize the state of the EJB module 302b, in operation 1311. The state partition 752 then initializes the SMUs in operation 1312. The SMUs are attached to the stored SMUs on the state server 212/214, in operation 1313, and the attached SMUs are recovered by the state partition 752, in operation 1314. SMUs of migration capable type in the RSM of the second J2EE server get their migrated state from first J2EE server through a RSM implementation specific state transfer protocol. Thereafter, the EJB activates the state partitions 752 for the EJB module 302b.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for migrating managed state for a Java based application, comprising the operations of:
   executing a first Java module on a first server, the first Java module including a first entity bean and a first state object in communication with the first entity bean, the first state object storing a state of the first entity bean;
   replicating the first state object to a state server; and
   starting a second Java module on a second server, the second Java module having a second state object.

2. A method as recited in claim 1, wherein the second state object obtains a related managed state through migration of state from the first server.

3. A method as recited in claim 1, wherein the second state object obtains a related managed state through recovery of the state replicated in the state server.

4. A method as recited in claim 1, wherein the state server is a memory replicated state server.

5. A method as recited in claim 1, wherein the state server is a disk replicated state server.

6. A method as recited in claim 1, wherein the second Java module further includes a second entity bean in communication with the second state object, wherein the second state object stores a state of the second entity bean.

7. A method as recited in claim 6, wherein checkpointing is used to replicate the first state object to the state server.

8. A method as recited in claim 7, wherein a migration-capable non-replicated state for the first entity bean is transferred to the second server.

9. A method as recited in claim 8, wherein a first replicated state manager executing on the first server transfers the migration-capable non-replicated state to a second replicated state manager executing on the second server.

10. A method as recited in claim 9, wherein the migration-capable non-replicated state is transferred using a replicated state manager specific transfer protocol.

11. A system for migrating managed state for a Java based application, comprising:

a first server executing a first Java module, wherein the first Java module includes a first entity bean and a first state object in communication with the first entity bean, the first state object storing a state of the first entity bean;

a state server in communication with the first server, the state server capable of managing replica of the first state object; and a second server in communication with the state server and the first server, the second server capable of starting a second Java module having a second state object.

12. A system as recited in claim 11, wherein the second state object is populated with managed state using the replica of first state object on the state server.

13. A system as recited in claim 11, wherein the second state object is populated with managed state using a copy of the first state object as managed in memory by a replicated state manager.

14. A system as recited in claim 11, wherein the state server is a memory replicated state server.

15. A system as recited in claim 11, wherein the state server is a disk replicated state server.

16. A system as recited in claim 11, wherein the second Java module further includes a second entity bean in communication with the second state object, wherein the second state object stores a state of the second entity bean.

17. A system as recited in claim 16, wherein checkpointing is used to replicate the first state object to the state server.

18. A system as recited in claim 17, wherein a migration-capable non-replicated state for the first entity bean is transferred to the second server.

19. A system as recited in claim 18, further including a first replicated state manager executing of the first server, the first replicated state manager capable of providing the migration-capable non-replicated state to a second replicated state manager executing on the second server.

20. A system as recited in claim 19, wherein the migration-capable non-replicated state is transferred using a replicated state manager specific transfer protocol.

21. A method for initializing migrating managed state for a Java based application, comprising the operations of:

sending a request to a second server to start a migrated module, the request being sent from a control module of a first module executing on a first server, wherein the control module passes a schema specification;

creating the migrated module on the second server;

creating a state partitions for the migrated module based on the passed schema specification; and recovering a managed state for the migrated module from a state server.

22. A method as recited in claim 21, further comprising the operation of initializing the managed state for the migrated module using a replicated state manager executing on the first server.

23. A method as recited in claim 22, wherein the replicated state manager uses a replicated state manager specific protocol to transfer initialization data to the migrated module.

24. A method as recited in claim 21, wherein a replicated state manager creates the state partitions for the migrated module based on the passed schema specification.

25. A method as recited in claim 24, wherein the replicated state manager further creates SMUs for the migrated module.

26. A method as recited in claim 25, further comprising the operation of informing the control module to switch control to the migrated module.

* * * * *